United States Patent
Kuruvilla et al.

(10) Patent No.: US 10,405,146 B1
(45) Date of Patent: Sep. 3, 2019

(54) VOICE ASSISTANCE DIRECTION

(71) Applicant: The Toronto-Dominion Bank, Toronto (CA)

(72) Inventors: Denny Devasia Kuruvilla, Toronto (CA); Vipul Kishore Lalka, Oakville (CA); Paige Elyse Dickie, Toronto (CA); Harjot Panag, Toronto (CA); Arun Victor Jagga, Toronto (CA); John Jong-Suk Lee, Toronto (CA); Michael W. Van Eesbeek, Markham (CA)

(73) Assignee: The Toronto-Dominion Bank, Toronto, Ontario ( * ) Notice: Subject to any disclaimer, the term of this patent is extended or adjusted under 35 U.S.C. 154(b) by 0 days.

(21) Appl. No.: 16/004,835

(22) Filed: Jun. 11, 2018

(51) Int. Cl.
*H04W 4/021* (2018.01)
*H04W 4/029* (2018.01)
(Continued)

(52) U.S. Cl.
CPC ............ *H04W 4/029* (2018.02); *G06F 3/167* (2013.01); *G10L 15/265* (2013.01); *H04W 4/021* (2013.01); *H04W 4/33* (2018.02)

(58) Field of Classification Search
CPC ... H04L 41/147; H04L 43/106; H04L 47/724; H04L 47/781; H04L 47/821; H04L 65/1046; H04L 41/0896; H04W 48/04; H04W 48/08; H04W 4/22; H04W 4/02; H04W 28/0289; H04W 88/06; H04W 48/02; H04W 48/06; H04M 2242/28; H04M 7/0057
See application file for complete search history.

(56) References Cited

U.S. PATENT DOCUMENTS 8,185,394 B2 5/2012 Jones et al.
2003/0101201 A1 5/2003 Saylor et al.
(Continued)

FOREIGN PATENT DOCUMENTS

CN 105788040 A 7/2016
WO WO2017122123 A1 7/2017

OTHER PUBLICATIONS

Böcker et al., 'Virtual Office Assistant on Magic Mirror,' Bachelor Thesis, May 31, 2017, 37 pages.

*Primary Examiner* — Nimesh Patel
(74) *Attorney, Agent, or Firm* — Fish & Richardson P.C.

(57) ABSTRACT

The present disclosure involves systems, software, and computer implemented methods for identifying locations associated with particular users in response to requests from a visitor or fellow user. One example system includes a communications module, a plurality of sensors located in a defined area configured to at least partially determine locations of at least one person, and a location database including location information received from the sensors associating particular persons with particular locations associated with particular sensors. A request for a location associated with a particular person is received from a first device. A current location associated with one of the plurality of sensors is determined from the location database, wherein the current location is also associated with the particular person. A response to request is generated including the current location and is transmitted to the first device.

17 Claims, 4 Drawing Sheets

(51) Int. Cl.
*G06F 3/16* (2006.01)
*G10L 15/26* (2006.01)
*H04W 4/33* (2018.01)

(56) References Cited

U.S. PATENT DOCUMENTS

| | | | |
|---|---|---|---|
| 2004/0192352 A1* | 9/2004 | Vallstrom | G01S 5/0027 455/456.6 |
| 2005/0144318 A1 | 6/2005 | Chang | |
| 2006/0063517 A1 | 3/2006 | Oh et al. | |
| 2006/0284979 A1* | 12/2006 | Clarkson | A61B 5/061 348/143 |
| 2006/0285685 A1* | 12/2006 | Msezane | G06Q 50/28 380/59 |
| 2007/0165796 A1 | 7/2007 | Jones et al. | |
| 2008/0005072 A1 | 1/2008 | Meek et al. | |
| 2008/0046170 A1 | 2/2008 | DeGrazia | |
| 2008/0070593 A1* | 3/2008 | Altman | H04W 4/029 455/457 |
| 2008/0319652 A1 | 12/2008 | Moshfeghi | |
| 2009/0253402 A1* | 10/2009 | Choo | G08B 25/016 455/404.2 |
| 2010/0030734 A1 | 2/2010 | Chunilal | |
| 2010/0125605 A1 | 5/2010 | Nair et al. | |
| 2012/0264446 A1* | 10/2012 | Xie | G01C 22/00 455/456.1 |
| 2013/0090939 A1* | 4/2013 | Robinson | G06Q 50/22 705/2 |
| 2015/0310566 A1* | 10/2015 | Smyth | G06Q 40/125 705/32 |
| 2016/0337828 A1* | 11/2016 | Michaelis | H04W 4/90 |
| 2017/0034689 A1 | 2/2017 | Lee et al. | |

\* cited by examiner

VOICE ASSISTANCE DIRECTION

TECHNICAL FIELD

The present disclosure relates to computer-implemented methods, software, and systems for identifying locations associated with particular users in response to requests from a visitor or fellow user. The disclosure describes systems for identifying a current or recent location of the particular user and identifying a location at which the particular user can be found within a location associated with an entity and/or business.

BACKGROUND

Digital, or virtual, personal assistants such as Apple's Siri, Google's Assistant, Amazon's Alexa, Microsoft's Cortana, and others provide solutions for performing tasks or services associated with an individual. Such digital personal assistants can be used to request and perform various data exchanges, including transactions, social media interactions, search engine queries, and others. Additionally, similar functionality can be incorporated into web browsers and dedicated applications. Digital or virtual assistants may be one type of conversational interface, where users can input a request or statement into the conversational interface and receive semantic output responsive to the original input. Conversational interfaces may be included in social networks, mobile applications, instant messaging platforms, websites, and other locations or applications. Conversational interfaces may be referred to as or may be represented as chat bots, instant messaging (IM) bots, interactive agents, or any other suitable name or representation.

Conversational interfaces are commonly integrated into dialog systems of these digital assistants or into specific applications or platforms, and can be used to engage in interactions from casual conversations to expert system analysis. Conversational interfaces may accept inputs and/or output responses in various formats, including textual inputs and/or outputs, auditory inputs and/or outputs, video-captured inputs (e.g., via facial movement input), or video or other animated output.

Current human resources strategies have adjusted to the change and availability in flexible working environments, both within an entity and/or at remote teleworking and/or other flexible seating locations. As such, many employees may not have a standard desk or home base at their place of employment, and may instead be assigned or have the option to select particular locations at which to sit or work upon arriving to the office.

SUMMARY

The present disclosure involves systems, software, and computer implemented methods for identifying locations associated with particular users in response to requests from a visitor or fellow user. A first example system includes a communications module, a plurality of sensors physically located in a defined area associated with an entity, each of the plurality of sensors configured to at least partially determine locations of at least one person, at least one memory storing instructions and a location database including location information received from the plurality of sensors associating particular persons associated with the entity with particular locations associated with particular sensors, and at least one hardware processor interoperably coupled with the at least one memory and the communications module. The instructions can instruct the at least one hardware processor to perform various action. In one implementation, a request for a location associated with at least one particular person is received from a first device via the communications module. A current location associated with one of the plurality of sensors is determined, from the location database, as associated with at least one particular person associated with the request. A response to the received request is generated, where the response includes the determined current location associated with the at least one particular person. The generated response is then transmitted, via the communications module, to the first device.

Implementations can optionally include one or more of the following features.

In some instances, each of the plurality of sensors determines locations of at least one person based on one or more devices associated with particular persons. In some of those instances, the sensors may perform at least one of the following: media access control (MAC) address tracking of devices at the location of the particular sensor, a beacon-based determination of a device's presence at the location of the particular sensor, a WiFi network connection analysis to identify connections to particular devices within a location associated with the sensor, an assisted Global Positioning Satellite (GPS) (aGPS) analysis of particular devices within a location associated with the sensor, or a scan of a unique user identifier from a device associated with a particular person, among others.

In some instances, each of the plurality of sensors is associated with a particular location within the defined area, and wherein, in response to a particular sensor detecting a particular person or a device associated with the particular person, the location of the particular person is associated with the particular location within the defined area associated with the particular sensor.

In some instances, the sensors determine locations of at least one person based on at least one of the following: a biometric analysis of persons at the location of the particular sensor, machine vision tracking identifying persons present at the location of the particular sensor, or scanning RFID tags associated with persons at the location of the particular sensor, among others.

In some instances, each sensor is associated with a particular location in an office, and wherein the sensors communicate with the at least one hardware processor via at least one of a WiFi, Ethernet, or intranet connection. In some of those instances, the location database includes information identifying at least one of a particular desk or a particular room within the defined location at which the at least one person is associated.

In some instances, the request is associated with a first person, and the request for the location associated with at least one particular person comprises a request from the first person for a location within the defined area associated with the entity at which a meeting with the at least one particular person is to occur. In those instances, determining, from the location database, the current location associated with the at least one particular person comprises identifying a location associated with the at least one particular person from the location database, wherein the identified location comprises a first location, and determining, based on the identified first location and a location of the first person, a second location different than the first location at which the at least one particular person can meet the first person within the defined area associated with the entity. The instructions further instruct the at least one hardware processor to generate a notification of the received request to the at least one particular person, where the notification includes an identification of the determined second location. In some of those instances, the second location comprises a meeting room while the first location is a desk at which the at least one particular person is located. In some of those particular instances, determining, based on the identified first location and the location of the first person, the second location different than the first location at which the at least one particular person can meet the first person within the defined area associated with the entity can include identifying at least one location different than the first location, determining, based on information from at least one sensor associated with at least one identified location, whether the at least identified location different than the first location is associated with at least one person at the time of the request, and, in response to determining that the at least one identified location is not associated with at least one person at the time of the request, identifying the at least one identified location as the second location. In some of those particular instances, at least one identified location different than the first location includes locations for use of private meetings within a threshold distance from the first location.

In some instances, the instructions further instruct the at least one hardware processor to generate a notification of the received request to the at least one particular person in response to generating the response. In some of those instances, the received request is received from a voice assistance interface system, wherein the voice assistance interface system performs a sentiment analysis of the request in response to submission of the request via the voice assistance interface system, and wherein the generated notification of the received request includes an indication of results associated with the performed sentiment analysis.

In some instances, the generated response includes an indication of directions to the determined current location.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The present disclosure describes various tools and techniques associated with identifying locations associated with particular users in response to requests from a visitor or fellow user. A voice assistance interface is commonly included with the described system in order to receive and interpret natural language requests and respond with a natural language response providing the requested information. The voice assistance interface may be a conversational interface that allows users to interact with a virtual person or system that can interpret an intent associated with input provided by the user and determine a suitable response. In the present solution, the request is for a current location of a particular user within a location associated with a particular entity.

Recently, a trend towards shared office space, and more specifically to "flexible office seating," has been growing. In such situations, users are able to enter an office and choose any available desk they desire to work at for a period of time. In some instances, the standard period may be for a day, while in others, the period may be longer (e.g., 2 days, a week, etc.) or shorter (e.g., several hours), as appropriate. The reason for such a trend is the increase in telecommuting for businesses and entities, allowing for significant (e.g., 20+%) seating requirements than normal real estate requirements. As some individuals may not visit the office each day, the need for a permanent and constant location is lessened and offset by the potential savings to employers. Additionally, the increase in shared workspace managed by a third-party can provide real estate set-up savings to employers, and alternative work environments and increased work space for others.

These cost savings and benefits, however, can come at a price, including confusion for external visitors as well as internal employees looking for an individual utilizing one of these shared work spaces. Therefore, a need for a system to direct internal and external visitors towards the individuals they are seeking to meet in or around these shared working spaces is needed. The system and methods described herein can monitor the locations at which particular users have "checked in," registered at, or otherwise selected as their particular desks using a plurality of sensors within the office location. In some instances, the location is static upon the initial selection or registration, while in others, the location may change as the particular users move throughout the workspace. For example, if a user has selected or been associated with a particular desk or office location during a visit, the user may be located, when a visitor arrives, at a different spot or location within the shared working space than that which they originally were associated. During operation, the system can monitor, using sensors placed throughout the space, updated locations associated with particular users. Using the current information in the system, a visitor can be routed to an appropriate location based on the current location of the person, which may be the person's current location, a nearby location (e.g., a conference room or other group space), or an alternative location. In some instances, in addition to notifying the visitor where to go, a notification to the particular person meeting the visitor can also be provided, including an indication of a location where the meeting can take place, which could be person's current location or an alternative, suitable location.

The systems described herein can use any suitable sensors to monitor for current locations of persons within the location, particular associations to desks or offices, and identify movement throughout the office space or location throughout the day. Sensors may include, but are not limited to, facial and visual feature detection sensors and other person-identifying sensors (e.g., based on detected biometric data of the user) or device-detecting sensors. The device-detecting sensors can include sensors allowing for a determination of person locations using indoor positioning systems, including Bluetooth location information or other types of beacons (e.g., iBeacons), Wi-Fi-based positioning systems and sensors, radio frequency identification (RFID) sensors, near-field communication (NFC) sensors, and others, as appropriate. Information identifying the particular person associated with a detected device can then be used to identify and confirm the person's current location.

In some instances, specific desks or locations can be manually associated with a person (e.g., through a tap or scan performed by the user at the location), while in others, the sensor(s) associated with a particular location can automatically associate particular users with the location based on their sensing operations. In other instances, persons may book or otherwise reserve a particular location (e.g., desk, office) online while not at the location. Upon arrival at the shared office space, the presence of the person can be acknowledged and the reserved location can be confirmed as the current location of the user. As people move through the office space, additional and/or alternative sensors can be situated and used to monitor and update the individuals' location. For example, sensor(s) in a conference room can determine that a person is at a meeting in a particular conference room, and can update that person's location in a location database based on the detection. Instead of locating the person at the registered or associated desk or office, directions to the person are instead made to the particular conference room, or to another convenient location nearby. In some instances, the sensors used to detect a particular location for a desk association of a person may be the same as or may differ from the sensors used for a conference room, depending on a particular implementation. Similarly, if a particular person is at a desk or office assigned to another, the local sensors associated with the current location can detect and relay the new location of the particular person to the backend system. Requests for a location of the particular person can then be based on the current location of the person, not a particular desk or office assigned or associated with that particular person.

Once the current location is determined, the system can provide that information to the requesting party. In some instances, the information can be provided to the requesting party as a list of directions to the current location (or an alternative location) of the particular person. The information can be provided through a virtual assistant, whether at a fixed device/location or on a mobile device associated with the requesting person. In some instances, the directions may identify a particular floor, area, office, and/or workstation, while in others the directions may be specific and on a turn-by-turn basis.

In some instances, and before providing the directions and/or location, the system can determine whether the requesting party is allowed and/or authorized to know the location of the particular person being sought. In some instances, the requesting party may be identified and/or authenticated using any suitable technique, including a facial scan, a different biometric analysis, provided credentials for the requesting party (e.g., an ID, a user name/password combination, etc.), or any other suitable authentication. Once the identity of the requesting party is determined, a determination can be made as to whether the requesting party should be provided information on the particular person. Such a determination can be based on the requesting party's identity, role, relationship to the particular person, and/or any other suitable information. In some instances, the additional check may be based on the particular person's calendar. If the requesting party is associated with an upcoming meeting or calendar entry of the particular person, then the information may be freely provided. Additionally, if appropriate, the directions to the particular person may be based on a predetermined meeting location, or alternatively, can be updated to a location convenient to both the requesting party and the current location of the particular person. In other instances, an analysis of the particular person's recent communications may be analyzed to determine if recent interaction indicates that a meeting is expected or appropriate. For example, if a recent message included the phrase "See you soon," then the visit may be viewed as appropriate. Other similar tools may be used to determine whether the information should be provided. In some instances, where the information is determined not to be provided, a communication and/or notification can be provided to the particular person of the requesting party, allowing the particular person the ability to choose to allow the information to be provided, ignore the request, or personally visit the location of the requesting party.

In some instances, the virtual assistant and/or related systems can include the ability to perform a sentiment analysis on the interactions with the requesting party. Should the sentiment analysis indicate that the requesting party is agitated, the system may be able to warn or provide that information to the particular person, or alternatively, determine whether location information should be provided at this time. In some instances, a brief indication of the sentiment of the requesting party can be provided with a notification to the particular person that the requesting party has arrived. Further, in some instances, the sentiment determination may be used to determine an appropriate location for the meeting. If the requesting party appears angry or agitated, a more or less public location may be preferred, depending on the identity of the requesting party. Additionally, information generally about the requesting party may be shared with the particular person, such as the requesting party's identity, a reason for the visit (if available), and/or any additional information to prepare for the interaction.

In one example implementation, the present solution may be realized using a computer, terminal, or other device at which a voice or virtual assistant is executing. The virtual assistant can provide a conversational interface that is used to understand, interpret, and interact with users in order to provide requested information or feedback. The virtual assistant can identify a requesting party and determine, based on a request, who are the requested particular person or persons. In some instances, the requesting party may provide a clear indication of the particular person that they are searching for, while in other instances, the virtual assistant may derive or determine the particular person based on the identity of the requesting party (e.g., by identifying a particular person using the calendar of the requesting party to determine who they may be searching for). Once the identity of the particular person is determined, a current location of that person can be determined. To do so, a location analysis system may be used.

The location analysis system may be a backend system, a cloud-based system, or any other system that identifies requests for particular person's locations, determines that particular person's current location, and provides that location back to the requesting party via the virtual assistant. The location analysis system can maintain or be associated with a user location database that is updated using a plurality of sensors to determine current locations of persons within the monitored location(s). In some instances, a current location may be used to determine where the particular person is, while in other instances, an expected or future location may also be determined. In some instances, the location analysis system may use one or more rules to determine an appropriate location to be returned, which may include or be based on the current location of the person, the expected location of the person, or an alternative location based on either the current or expected location of the person.

The plurality of sensors can be placed throughout the monitored location, and can be used to determine where, upon detection of particular persons and/or devices (e.g., smartphones, laptops, etc.) associated with particular persons, that particular person is located. In some instances, the sensors may be able to detect persons at different locations using a single sensor (e.g., based on signal strength to a beacon or WiFi transmitter) or by using a combination of sensors (e.g., by triangulating locations based on detected interactions). In still some instances, some sensors may determine the location of the particular person based on facial and/or biometric analysis. In still other instances, the sensors may detect location based on interaction with the particular person and/or a device (e.g., a mobile device, usage of a key card/fob/token, etc.), and can use those interactions to determine the location of the particular person.

The illustrated examples of the present disclosure are meant to provide example implementations of the solution, and are not meant to be limiting.

Figure 1:
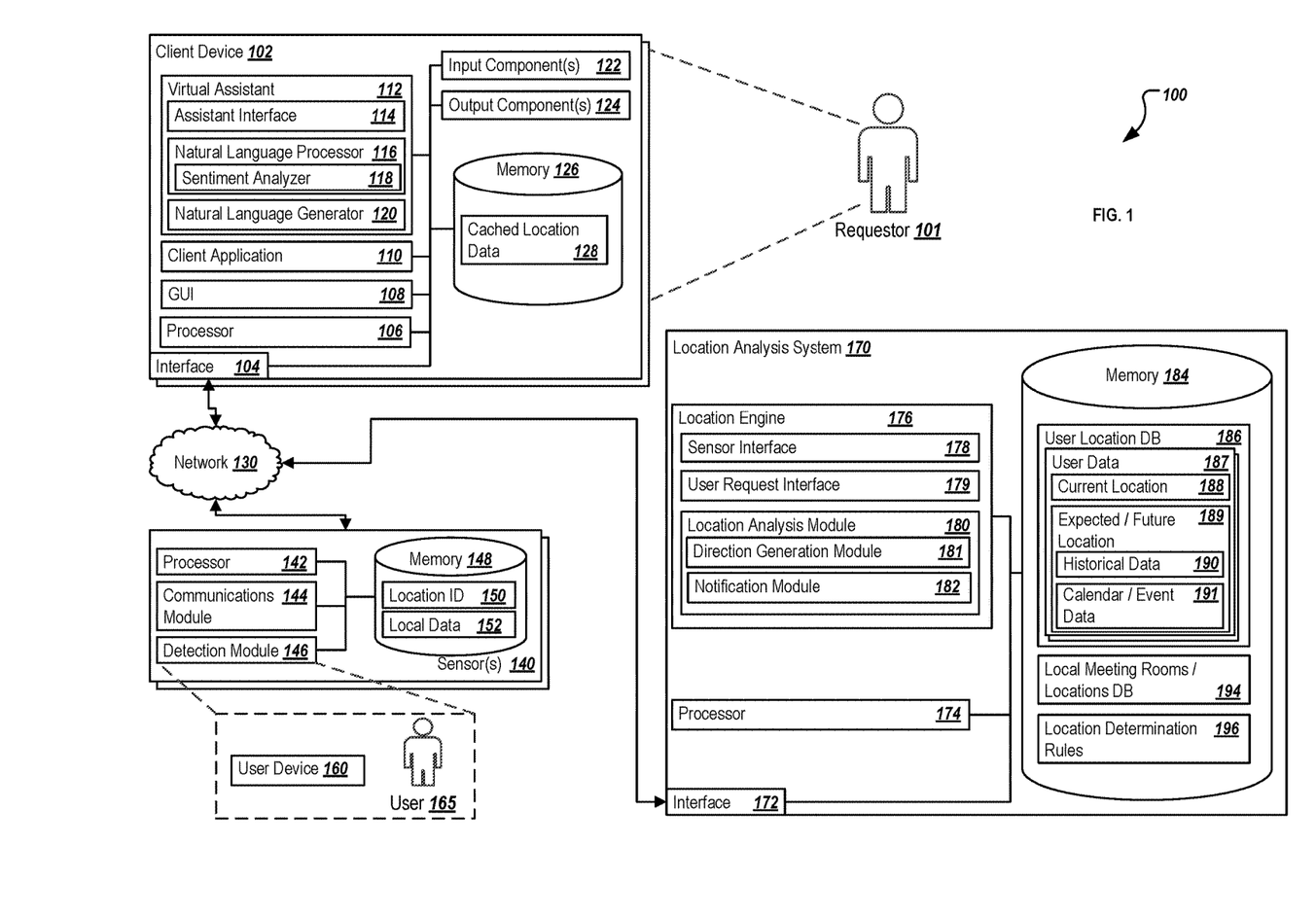
FIG. 1 is a block diagram illustrating an example system for identifying locations associated with particular users in response to requests from a visitor or fellow user.

Turning to the illustrated example implementation, FIG. 1 is a block diagram illustrating an example system 100 for identifying locations associated with particular users in response to requests from a visitor or fellow user. System 100 includes functionality and structure associated with receiving natural language inputs from a requestor or requesting party 101 via client device 102, analyzing the received input via the virtual assistant 112 and its interface 114 to convert the input into an electronic format, determine, by a location analysis system 170 based on the input, an identity of the particular person or user 165 associated with the request, and subsequently determine a current and/or expected location of the user 165 within a monitored location. The location analysis system 170 can identify current locations of users 165 using one or more sensors 140, which can determine or detect a user's presence based on any number of detection techniques, where upon detection, an associated location can be assigned to the user 165. The location information can be stored in a user location database 186, where that information is used to determine a current and/or expected location of the particular person in response to received requests. Depending on a set of location determination rules 196, a context of the request, and the stored information, and a suitable response is generated and returned to the requestor 101 via the virtual assistant 112. As illustrated, system 100 includes or is communicably coupled with a client device 102, a location analysis system 170, one or more sensors 140, and network 130. System 100 is a single example of a possible implementation, with alternatives, additions, and modifications possible for performing some or all of the described operations and functionality. Although shown separately, in some implementations, functionality of two or more systems, servers, or illustrated components may be provided by a single system or server. In some implementations, the functionality of one illustrated system or server may be provided by multiple systems, servers, or computing devices, including those physically or logically local or remote to each other. Any combination or permutation of systems may perform the functionality described herein. In some instances, particular operations and functionality described herein may be executed at either the client device 102, the location analysis system 170, or at one or more other non-illustrated components, as well as at a combination thereof.

As used in the present disclosure, the term "computer" is intended to encompass any suitable processing device. For example, client device 102 and the location analysis system 170 may be any computer or processing device (or combination of devices) such as, for example, a blade server, general-purpose personal computer (PC), Mac®, workstation, UNIX-based workstation, embedded system or any other suitable device. Moreover, although FIG. 1 illustrates particular components as a single element, those components may be implemented using a single system or more than those illustrated, as well as computers other than servers, including a server pool or variations that include distributed computing. In other words, the present disclosure contemplates computers other than general-purpose computers, as well as computers without conventional operating systems. Client device 102 may be any system which can request data, execute an application (e.g., client application 110 and virtual assistant 112), and/or interact with the location analysis system 170 and the virtual assistant 112. The client device 102, in some instances, may be any other suitable device, including a mobile device, such as a smartphone, a tablet computing device, a smartwatch, a laptop/notebook computer, a connected device, or any other suitable device. Additionally, the client device 102 may be a desktop or workstation, server, or any other suitable device, as well as a device specifically designed to interact with requestors 101. Similarly, the location analysis system 170 may be a server, a set of servers, a cloud-based application or system, or any other suitable system. In some instances, the client device 102 may execute on or be associated with a system executing the location analysis system 170. In general, each illustrated component may be adapted to execute any suitable operating system, including Linux, UNIX, Windows, Mac OS®, Java™, Android™, Windows Phone OS, or iOS™ among others.

Illustrated system 100 includes at least one client device 102, and may include a plurality of client devices 102 in some instances, such as at or near entrances of the monitored location. Each client device 102 may generally be any computing device operable to connect to or communicate within the system 100 via the network 130 using a wireline or wireless connection. In general, the client device 102 comprises an electronic computer device operable to receive, transmit, process, and store any appropriate data associated with the system 100 of FIG. 1. As illustrated, the client device 102 can include one or more client applications, including the client application 110 and a virtual assistant 112. In some instances, the virtual assistant 112 may be a part of the operating system executing on the client device 102, or may be a standalone application or client-side agent of a backend application (e.g., location engine 176). In some instances, the client device 102 may comprise a device that includes one or more input components 122, such as a keypad, touch screen, camera, microphone, or other component(s) that can interact with the client application 110 and/or virtual assistant 112 and other functionalities, and one or more output components 124 that convey information associated with the operation of the applications and their application windows to the user of the client device 102. The output components 124 can include a display, one or more speakers, or any other suitable output components. The information presented by the output components 124 can include digital data, visual information, auditory output, or a graphical user interface (GUI) 108, as shown with respect to the client device 102. In general, client device 102 comprises an electronic computer device operable to receive, transmit, process, and store any appropriate data associated with the environment 100 of FIG. 1.

In some instances, the client device 102 may be a mobile device, including but not limited to, a smartphone, a tablet computing device, a laptop/notebook computer, a smartwatch, or any other suitable device capable of interacting with the location analysis system 170 and provide the virtual assistant 112. In other instances, client device 102 may instead be a workstation, a dedicated console or computer, or any other suitable device. One or more client applications 110 may be present on a client device 102 in addition to the virtual assistant 112, and can provide varying functionality for users. In some instances, the client application(s) 110 may be a web browser, mobile application, cloud-based application, or dedicated remote application or software capable of interacting with at least some of the illustrated systems via network 130 to request information from and/or respond to one or more of those systems.

The virtual assistant 112 may be any interactive artificial or virtual intelligence component, agent, or other functionality that can be interacted with by a requesting user 101, either textually or verbally through one or more input components 122 (e.g., a microphone), manually through one or more input components 122 (e.g., physical or virtual keyboards, touch screen buttons or controls, other physical or virtual buttons, etc.), or through captured gestures or movements identified by the client device 102, in order to request a location for a particular person or user 165. In general, the virtual assistant 112 may be a software agent, module, or component, among others, that can perform tasks or services for an individual in response to one or more inputs, and can include or represent a particular conversational or assistant interface 114 associated with the location analysis system 170.

Any suitable commercial example of a virtual assistant may be used, as well as other proprietary or application-specific assistants. The virtual assistant 112 may work and interact via text (e.g., chat), voice, image submission, or other suitable inputs. Some virtual assistants can interpret input using natural language processing (NLP) via natural language processor 116 to match user text or voice input to executable commands and/or queries. In some instances, the virtual assistant 112 can be interacted with to initiate and perform one or more input and response interactions described herein. In some instances, the virtual assistant 112 may be a standalone application (e.g., Google Assistant executing on an iPhone), functionality included in a particular application used for other purposes (e.g., an Alexa-enabled Amazon app), or an agent or other functionality built into the operating system (e.g., Siri on Apple's iOS). In addition to receiving and interpreting input from the requestor 101, the virtual assistant 112 can be used to present a natural language response back to the user via natural language generation (NLG) (e.g., performed by natural language generator 120). In some instances, at least a portion of the NLG and/or NLP functionality may be performed remotely from the client device 102, such as the location analysis system 170 or another remote system, including by one or more cloud-based solutions. Once a response is generated by the location analysis system 170 and received at the client device 102, the instructions or information associated with the response can then be presented by the assistant interface 114 to the user via GUI 108 and/or other suitable output components 124. In some instances, the virtual assistant 112 and/or the location analysis system 170 may provide the response to the requesting user 101 in another manner, such as an email, a text message, through one of the client applications 110, or through the user's personal device or channels.

The client application(s) 110 on the client device 102 can be any type of application that allows the client device 102 to request and view content. In some instances, client application 110 may correspond with one or more backend applications or functionality, including an application or platform associated with the location analysis system 170. In some instances, the client application 110 can be associated with a client-side version of the location engine 176, where the client-side version of the location engine 176 can represent a means for users to provide inputs to the virtual assistant 112 and receive the location analysis results for viewing at the client device 102 and/or on a separate device associated with the requestor 101.

As illustrated, the client device 102 includes an interface 104. Interface 104 is used by the client device 102 for communicating with other systems in a distributed environment—including within the environment 100—connected to the client device 102 and/or network 130, e.g., sensor(s) 140 and/or the location analysis system 170, as well as other systems or components communicably coupled to the network 130. Generally, the interface 104 comprises logic encoded in software and/or hardware in a suitable combination and operable to communicate with the network 130 and other communicably coupled components. More specifically, the interface 104 may comprise software supporting one or more communication protocols associated with communications such that the virtual assistant 112, the client application(s) 110, the network 130, and/or the interface's hardware is operable to communicate physical signals within and outside of the illustrated environment 100.

Network 130 facilitates wireless or wireline communications between the components of the environment 100 (e.g., between combinations of the location analysis system 170, client device(s) 102, and/or the other components, among others) as well as with any other local or remote computer, such as additional mobile devices, clients, servers, remotely executed or located portions of a particular component, or other devices communicably coupled to network 130, including those not illustrated in FIG. 1. In the illustrated environment, the network 130 is depicted as a single network, but may be comprised of more than one network without departing from the scope of this disclosure, so long as at least a portion of the network 130 may facilitate communications between senders and recipients. In some instances, one or more of the illustrated components (e.g., the location analysis system 170 or the virtual assistant 112) or portions thereof (e.g., the location engine 176, or other portions) may be included within network 130 as one or more cloud-based services or operations. The network 130 may be all or a portion of an enterprise or secured network, while in another instance, at least a portion of the network 130 may represent a connection to the Internet. In some instances, a portion of the network 130 may be a virtual private network (VPN) or an Intranet. Further, all or a portion of the network 130 can comprise either a wireline or wireless link. Example wireless links may include 802.11a/b/g/n/ac, 802.20, WiMax, LTE, and/or any other appropriate wireless link. In other words, the network 130 encompasses any internal or external network, networks, sub-network, or combination thereof operable to facilitate communications between various computing components inside and outside the illustrated environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

The client device 102 also includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the client device 102, in particular those related to executing the various modules illustrated therein and their related functionality. Specifically, the processor 106 executes the algorithms and operations described in the illustrated figures, as well as the various software modules and functionalities, including the functionality for sending communications to and receiving transmissions from various components in the illustrated system 100, as well as to process and prepare responses to received input associated with the virtual assistant 112. Each processor 106 may have a single core or multiple cores, with each core available to host and execute an individual processing thread.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, Objective-C, JavaScript, Java™, Visual Basic, assembler, Perl®, Swift, HTML5, any suitable version of 4GL, as well as others.

GUI 108 can interface with at least a portion of the environment 100 for any suitable purpose, including generating a visual representation of the client application(s) 110 and/or the virtual assistant 112, presenting a pop-up or push notification or preview thereof, presenting the UI associated with the virtual assistant 112 (e.g., to show a direction, path, or map associated with the meeting location with a particular person), or any other suitable presentation of information. GUI 108 may also be used to view and interact with various Web pages, applications, and Web services located local or external to the client device 102, as well as information relevant to the client application 110. Generally, the GUI 108 provides the user with an efficient and user-friendly presentation of data provided by or communicated within the system. The GUI 108 may comprise a plurality of customizable frames or views having interactive fields, pull-down lists, and buttons operated by the user. For example, the GUI 108 may provide interactive elements that allow a user to view or interact with information related to the operations of processes associated with the location analysis system 170 and any associated systems, among others. In general, the GUI 108 is often configurable, supports a combination of tables and graphs (bar, line, pie, status dials, etc.), and is able to build real-time portals, application windows, and presentations. Therefore, the GUI 108 contemplates any suitable graphical user interface, such as a combination of a generic web browser, a web-enabled application, intelligent engine, and command line interface (CLI) that processes information in the platform and efficiently presents the results to the user visually.

As illustrated, the client device 102 includes memory 126. In some implementations, the client device 102 includes a single memory or multiple memories. The memory 126 may include any type of memory or database module and may take the form of volatile and/or non-volatile memory including, without limitation, magnetic media, optical media, random access memory (RAM), read-only memory (ROM), removable media, or any other suitable local or remote memory component. The memory 126 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the client device 102 and/or the location analysis system 170. Additionally, the memory 126 may store any other appropriate data, such as VPN applications, firmware logs and policies, firewall policies, a security or access log, print or other reporting files, as well as others. As illustrated, memory 126 includes, for example, a set of cached location data 128. In some instances, the cached location data 128 may be used to respond to requests from the requestor 101 instead of returning or sending the requested information to the location analysis system 170. Additionally, the location data 128 may be cached for a period of time in order to allow requestors 101 to return to the client device 102 for repeat instructions if an attempt to follow the directions fails, or is unsuccessful. Where the client device 102 is a mobile device associated with the requestor 101, the cached location data 128 can be stored until the location is determined to be reached, the meeting has been completed, or until a time after the scheduled meeting has occurred, among others. In some instances, some or all of the data included in memory 126 in FIG. 1 may be located outside of the client device 102, including within network 130 as cloud-based storage and data, or remote at the location analysis system 170, where appropriate.

As illustrated, FIG. 1 includes a plurality of sensors 140. The sensors 140 may be any suitable sensor type, where the sensor is capable of, or can contribute to, the identification of particular persons throughout an area within a monitored location. In some instances, the sensors 140 may be physically attached to certain designated locations, where, if the particular sensor 140 detects a person 165 or a device associated with the user 165 (e.g., a mobile device, a smartphone, a smart watch, a key fob, a badge, etc.), then that person is determined to be at or near the designated location associated with the sensor 140. In other instances, detections may be made by two or more sensors 140 working together to identify a location of the user 165 and/or the user's device 160 based on a combination of detections by the sensors 140. In still other instances, a single sensor 140 in a particular location may be able to identify the location of users 165 and/or user devices 160 in different locations throughout the monitored location (e.g., based on signal strength of a device 160).

In some instances, a single type of sensor 140 may be used throughout the location, while in others, two or more different types of sensors 140 may be used. Some sensors 140 may directly determine a location of particular persons, while in other instances, information detected by a particular sensor 140 or combination of sensors 140 may be used to indirectly identify the device 160 and/or user 165. Examples of a direct determination may be based on a facial identification of the user 165, an RFID or NFC scan of the user device 160, or a scan of a badge or key fob associated with the user 165.

As illustrated, an example sensor 140 can include at least one processor 142, a communications module 144, a detection module 146, and a memory 148. Different sensors 140 may have different and/or alternative architectures. The at least one processor 142 may be similar to or different from processor 106, and may be specifically designed for a passive and/or active sensor 140. The communications module 144 may be similar to interface 104, in that the communications module 144 can be used by the sensor 140 to communicate with network 130 and/or the location analysis system 170. Detection module 146 may be any suitable detection component, including an iBeacon, a Wi-Fi-based positioning sensor, an RFID sensor, or an NFC sensor, among others. In some instances, sensors 140 may be used in combination, such as a first sensor 140 to determine when to check for a person (e.g., upon a pressure sensor being activated in a chair), and a second sensor 140 to activate a scan or detection process in response to the first sensor's determination.

Memory 148 may be similar to or different than memory 126. In some instances, memory 148 may include or store a location identifier or location ID 150, which can be used to associate the particular location of the sensor 140 with any detections by the detection module 146. Additionally, local data 152 may include information used to provide additional information about the user's location, as well as information describing contextual information as determined by the sensor 140 (e.g., a speed of passing the sensor 140 to determine whether the person appears to be stopping or continuing on). In some instances, the sensor 140 may collect a set of detections over a period of time (e.g., 30 seconds, 1 minute, 5 minutes, etc.) and send them in a batch or single message to the location analysis system 170.

In response to detecting a particular person (or persons), the communication module 144 can generate or forward a message or indication to the location analysis system 170 (e.g., via the sensor interface 178) that includes an identification of a user 165 or user device 160 and a particular location associated with the detection, potentially including the location ID 150 or other location information related to the sensor 140, the user 165, and/or the user device 160.

The location analysis system 170 of FIG. 1 describes or represents a system, server, or combination of computers that can perform functionality associated with managing location-related information associated with one or more persons in a monitored location or environment based on sensor data and additional analyses. In response to receiving a request from a requestor 101 for the location or a meeting place associated with a particular person, the location analysis system 170 can determine and provide information on a particular location of and/or directions to reach the particular person requested. In some instances, the location analysis system 170 may perform an authentication check to determine whether the requestor is authorized to receive information about the particular person and their location, or if the requestor 101 is authorized to move about relatively freely in the monitored environment.

As illustrated, the location analysis system 170 includes an interface 172 (similar or different to interface 104), at least one processor 174 (similar or different to processor 106), a location engine 176, and memory 184. Different implementations may include additional or alternative components, with FIG. 1 meant to be an example illustration of one possible implementation. While illustrated separate from one another, at least some of these described elements may be combined within a single component or system, or may be implemented separate from one another, including at different systems, computers, and/or at remote components.

The location engine 176 is executed by the at least one processor 174, and performs operations associated with the location determination described herein. As illustrated, the location engine 176 includes a sensor interface 178, a user request interface 179, and a location analysis module 180. The sensor interface 178 may be any suitable interface, including an application programming interface (API), a messaging endpoint, or any other suitable component able to receive location information from the one or more sensors 140. The sensor interface 178 may include functionality to parse received messages or communications from sensors 140, and can store data identifying a particular user's location (as identified by the sensor 140) in a user location database 186 (described below). The location information can be associated with the person and can be used, in part, to determine a person's current and/or expected location in response to the request.

The user request interface 179 of the location engine 176 can interact with the virtual assistant 112 and incoming requests from the requestors 101. The user request interface 179 can receive the analyzed request, along with any additional information, to determine the user who is being requested, the requestor 101 submitting the request, and any other appropriate information. That information can then be passed to the location analysis module 180, with the output of the location determination being sent by the user request interface 179 back to the virtual assistant 112 for presentation to the requestor 101.

The location analysis module 180 performs the location determination functions for the location analysis system 170. Based on the identity of the particular person being requested, the location analysis module 180 can access the user location database 186 to find a user-specific data entry 187. The user-specific data entry 187 can include information identifying a current and/or most recent location as determined by at least one of the sensors 140 (e.g., the current location 188), as well as information identifying expected and/or future locations 189 where the user may or is scheduled to be. In some instances, the expected or future location 189 may be based on historical location data 190, such as prior locations at which the user has been previously located. In some instances, the historical data 190 may be raw data, while in others the historical location data 190 may be processed and analyzed data used to determine likely locations within the monitored location at which the user may be, including based on a statistical or trend analysis. In some instances, the historical location data 190 can be used as a potential location when the current location 188 is stale or otherwise unlikely to be of assistance. In some instances, the current location 188 (e.g., the last location information received) can be used in combination with the historical data 190 to determine a likely or potential location of the user. For example, if the user was recently at location A, and the historical data 190 shows that at a particular time after the user was at location A they typically move to location B, then location B may be determined to be a likely location of the user where no other updates to the current location 188 are received. In addition to being based on the historical data 190, the expected or future location of the user may be based on an electronic calendar or subscribed event data 191, where the calendar and/or event data includes or is associated with a particular location. For example, where a particular user is scheduled to be in a meeting in location X during a certain period of time, the likely current location of the user is location X. That location can be used as an expected location of the person, unless alternative location information is received via the location system and one or more of the sensors 140.

Once the current location of the particular person being requested is identified, a direction generation module 181 can be used to determine a location at which the meeting is to occur, as well as how the requestor 101 should be directed. In some instances, the direction generation module 181 can access and interpret a set of location determination rules 196 to determine, based on the information available, how and where to direct the particular person and the requestor 101. In some instances, the location determination rules 196 can be applied to determine whether the requestor 101 is allowed to see or visit the particular person, as well as where in the monitored location the requestor 101 is allowed to visit (e.g., a particular requestor 101 may not be allowed in a certain area of the monitored location, such that an alternative meeting location may need to be identified). In some instances, memory 184 includes a set of local meeting rooms and locations database 194. The locations database 194 provides information about various particular locations within the monitored location that includes and identifies particular meeting rooms and other locations at which meetings can occur, be scheduled, and/or where requestors 101 can be directed to meet with one or more requested persons. In some instances, current or recent information about those locations may be available based on sensor 140 data obtained through routine monitoring. In some instances, a sensor 140 associated with a conference room may determine that the room is empty. Based on this, a new meeting may be directed to that location based on the empty room. Similarly, other portions of the monitored location may be determined to be relatively high density or low density based on recent or current information, as well as historical or other expected information related specifically to the particular location within the monitored location. Any other suitable information about particular locations may be used or stored in memory 184. For example, if the requested person or user is sitting or located at a relatively high density location, then a requestor 101 and the user 165 may be directed to another location with a lesser density when the operations are performed. Similarly, if the requested person is not in a location accessible to or authorized for the requestor 101, then the direction generation module 181 can identify the proper location based on the location determination rules 196.

In general, the location determination rules 196, or location determination rule set 196, can provide rules and parameters determining how particular requests are handled, whether particular requestors 101 are allowed to be provided directions to the requested person, how and where the requestors 101 are directed, the particular locations at which meetings are to occur, and how responses are handed, in general. The location determination rules 196 may determine how all interactions are handled by the location analysis module 180, or they may recommend how particular situations may adapt a normal or standard set of location and direction information. While interpreting particular requests from requestors 101, the location analysis module 180 can use these rules 196, information about particular users (e.g., their current location), information about available locations within the monitored location (e.g., particular meeting rooms, areas around the current location of the particular person, etc.), and other relevant information, including information about the requestor 101, to determine how the request should be handled. One example of how information about the requestor 101 may be used is where the sentiment analyzer 118 determines that the requestor 101 may be agitated. In some instances, and based on the identity of the requestor 101, a relatively higher or lower density location may be desired, either to ensure that the meeting is relatively more public or relatively more private. In such instances, the location at which the meeting is to take place can be determined based on the particular rules and settings in the location determination rule set 196.

The location analysis module 180 also includes a notification module 182. The notification module 182 can be used to provide a response back to the client device 102 at which the request is received to be presented to the requestor 101. Additionally, the notification module 182 can be used to generate a notice or indication of the person requesting the particular user, and transmit, via interface 172, that information to the particular person/user 165 or the device 160 associated with the particular person/user 165. The notification sent may include an indication of the identity of the requestor 101, information about any related or scheduled meetings with or associated with the requestor 101, a current sentiment of the requestor 101 where available, and/or any other suitable information, including a particular location within the monitored location (e.g., a particular conference room, desk address, lobby, etc.) at which to meet. The notification can be sent directly to a user device 160, a desktop or laptop of the user, an alternative device, and/or to any other suitable location. In some instances, the notification may be a push message, a text message, a phone call, an email, or any other suitable format.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
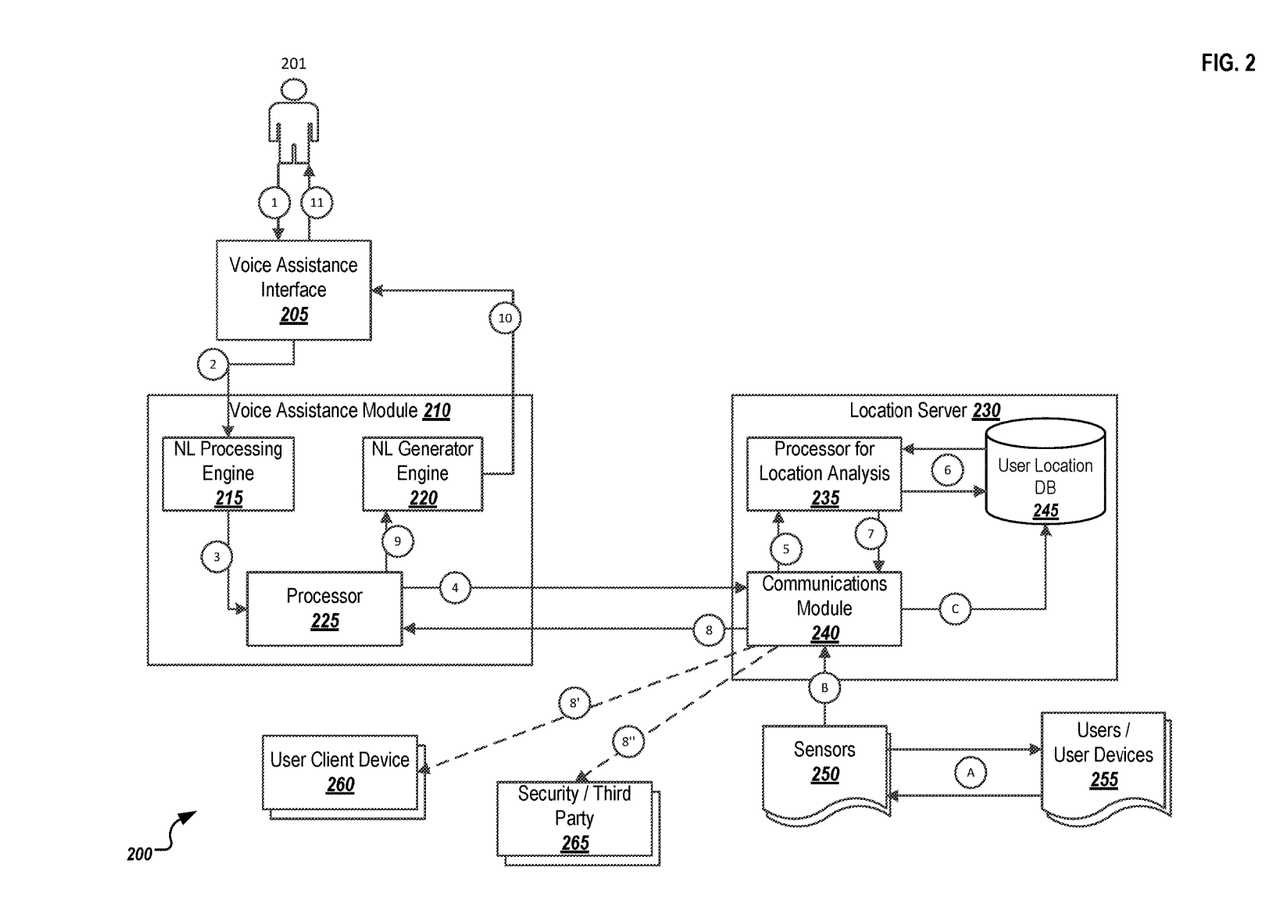
FIG. 2 is an illustration of a data and control flow of example interactions performed by a system performing user location operations and request responses using a voice assistance interface and backend location server.

FIG. 2 is an illustration of a data and control flow of example interactions performed by a system performing user location operations and request responses using a voice assistance interface and backend location server. The diagram provides an example set of operations and interactions to interpret and respond to requests provided via a requestor 201. Illustrated in FIG. 2 are the requestor 201 interacting through a voice assistance interface 205 associated with a voice assistance module 210 (which may be located or executed at a same or different component), which interacts with a location server 230 capable of providing location and/or routing information in response to input from the requestor 201. The location server 230 interacts with a plurality of sensors 250, which can be used to identify and update location information based on detection of users, user devices associated with particular users, and other available information within a monitored location. Further, the location server 230 may also be in communication with one or more other components, including the illustrated user client device 260 and/or the security system and/or other third party components 265. These components may be similar to or different the components described in FIG. 1.

As illustrated, a requestor 201 initially interacts (at indicator 1) with the voice assistance interface 205. The voice assistance interface 205 may be associated with a dedicated computing system and/or a mobile device associated with the requestor 201, as well as with any other suitable component. In some instances, the voice assistant interface 205 may be a computing system encountered by visitors for signing in or registering at a particular place of business, such as an office providing a flex working environment. The interactions with the requestor 201 can be used to receive a request for a particular person or user located at the monitored location.

As illustrated by indicator 2, the voice assistance interface 205 can forward the received information to the voice assistance module 210, and in particular, to the natural language processing engine 215. The natural language processing engine 215 can parse the verbal interactions with the requestor 201 into a computer-readable request, which is then sent via processor 225 (as shown by indicator 3) to the location server 230.

Location server 230 receives the information from the voice assistance module 210 (as shown by indicator 4) at communications module 240, which provides an interface for communications with various systems associated with the location determination process. The communications module 240 can forward (as shown by indicator 5) the received request to a processor for location analysis 235 (e.g., a location engine, such as location engine 176 of FIG. 1). Using the request, the processor 235 accesses stored location information from the user location database 245 and obtains the current location of the particular person associated with the received request (as shown by indicator 6). The processor 235 can, based on that current location (or alternatively, information related to a possible or recent location) and any suitable location determination rules, identify a location at which the requestor 201 should be sent to meet the particular person. The various permutations and rules are described above with relation to FIG. 1, but any suitable determination of the proper location, or if there is a proper location, can be applied. Further, in some instances, no suitable location exists, either because none are available, the particular person is busy or unavailable, or the requestor 201 is not authorized to meet with and/or know information about the particular person, among others. The processor 235 can then return an indication that no meeting or location is to be provided. In some instances, one or more alternative persons or other assistance may be provided or suggested.

As shown by indicator 7, the results of the location analysis are provided to the communications module 240 in order for such information to be communicated throughout the system. First, the determined location can be provided back to the voice assistance module 210 for processing (shown by indicator 8), the results of which can be provided to the natural language generator engine 220 to perform a natural language generation process. The results of the generation can then be provided (as shown by indicator 9) to the voice assistance interface 205 (as shown by indicator 10) and returned to the requestor 201 in a natural language response (as shown by indicator 11), as well as using any other suitable presentation or display, including via a graphical user interface or through another channel or messaging path. In some instances, the response may not be provided orally, and may only be provided in writing or by a presentation of the determined location and/or a path to the determined location.

In some instances, the communications module 240 can provide a notification of the requestor 201 to the client device 260 of the particular person or user who is being requested, as shown by indicator 8'. The communication to the user device 260 can include a notification of the requestor's identity, a location at which the meeting is to take place, particularly if that location is different than the user's current location, and other related information, including a determined sentiment of the requestor 201, additional information about a known or scheduled meeting associated with the request, as well as any other suitable information. In some instances, information about the request can be sent to the user device 260 prior to the response being sent to the voice assistance module 210. In doing so, the particular person may have the opportunity to reject or decline the meeting or interaction, where the location server 230 would then provide an unavailable message back to the requestor 201.

In still another example, the location server 230 can also, via the communications module 240, interact with a security or other third party system 265 as shown by indicator 8". For example, information about the requestor 201 may be obtained via the third party system 265 in order to determine the appropriate location at which the parties should meet (e.g., in a secure area of the monitored location, in a public area, etc.). The interactions with the third party system 265 may obtain additional information about the requestor 201 to supplement any notifications being sent, in addition to assisting in the determination of the proper location to meet. Any suitable considerations or additional information may be obtained as needed for a particular implementation.

Information on where to send the requestor 201 and/or where to hold the interaction is based on the information in the user location database 245. The population and updating of the database can occur prior to, during, and after requests are received from different requestors 201. As illustrated in FIG. 2, a plurality of location sensors 250 may be included in or associated with the monitored location in which the location determination process is being performed. Some sensors 250 may be specifically associated with a location, such that when a person or user device associated with a person is detected, their location can be determined to be at the location associated with the specific sensor 250 (or combination of sensors 250) detecting that location. In other instances, sensors 250 may detect a user or user device 255 (as illustrated by indicator A), and from that detection, perform a location determination to identify the location of the user. Different types and combination of sensor types can be used in various implementations, as well as different types and methods for detection. Examples include, but are not limited to, media access control (MAC) address tracking, biometric scanning, beacon technology and detections, Bluetooth and Wi-Fi detection-based location analysis, AGPS systems, mobile device pinging, machine vision tracking, QR code tracking, and pressure sensors, among others. In some instances, the presence of a person or device may be identified by one sensor 250, and another sensor 250 is notified to perform an identification. Where the detection is of a device 255, the user who is associated with the device 255 can be associated with the device's detected location.

The sensors 250 can provide the detected information back to the location server 230 via the communications module 240 (or any other suitable interface) as shown by indicator B, and the communications module 240 can populate and/or update the user location database 245 accordingly (shown by indicator C). Updates to the user location database 245 can be performed over time to provide a dynamically updated listing of current locations throughout the monitored location. In some instances, and as described previously, additional information about expected and historical locations can be used to determine the likely current location of the particular person. Further, one or more nearby or other meeting locations in the monitored location can be tracked in order to determine whether those locations are currently available. For instance, one or more sensors 250 can determine if a particular conference room is empty. If the location determination rules used by the location server 230 to determine where a meeting should occur indicate a conference room may be needed, the current location of the user from the database 245 can be consulted and compared to the currently available conference rooms and other meeting locations. An appropriate location can be determined, and the processor 235 can provide that location as the place for the meeting to occur.

Figure 3:
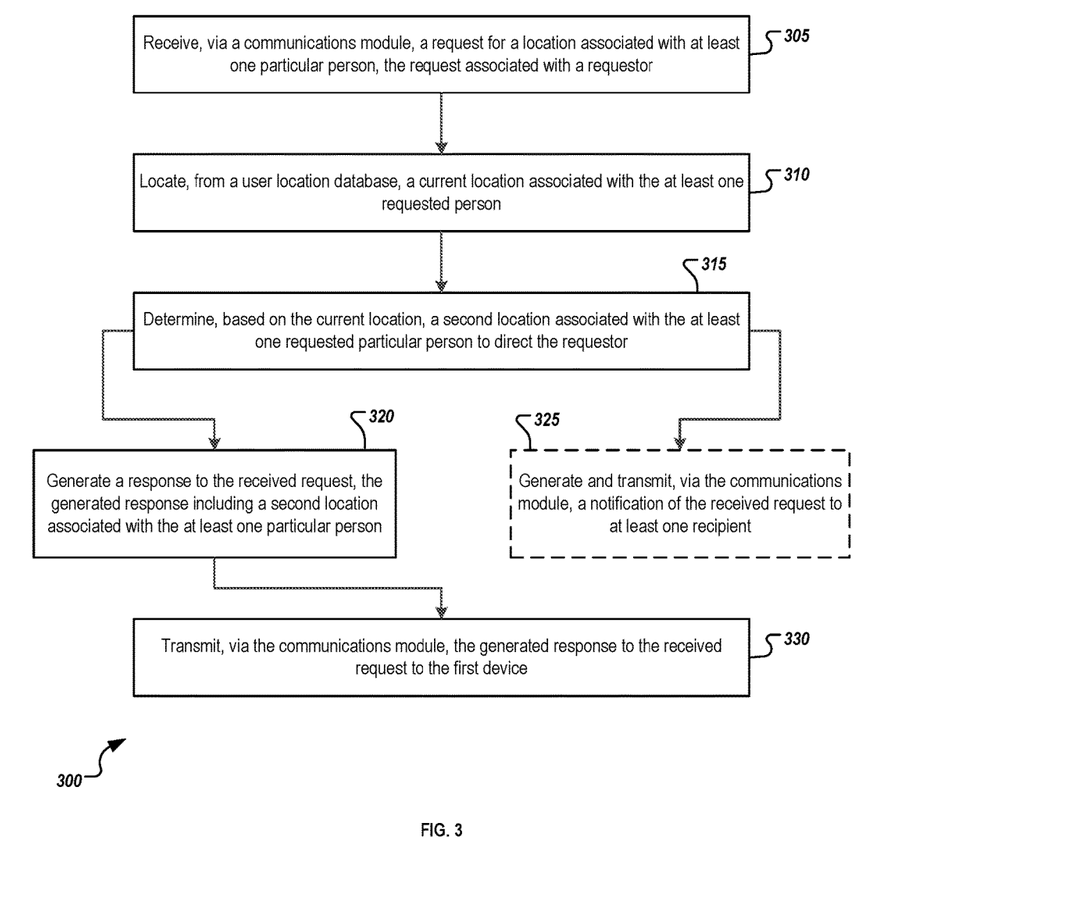
FIG. 3 is a flow chart of an example method performed in connection with a system monitoring locations of particular users within or associated with an entity and providing a location at which that person can be found at the present time or in the near future.

FIG. 3 is a flow chart of an example method 300 performed in connection with a system monitoring locations of particular users within or associated with an entity and providing a location at which that person can be found at the present time or in the near future. It will be understood that method 300 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 300. In some implementations, the method 300 and related methods are executed by one or more components of the system 100 described above with respect to FIG. 1, or the components described in FIG. 2.

At 305, a request for a location associated with at least one particular person is received via a communications module. In some instances, the request is received via a voice assistance interface in a natural language request. In some instances, the request may be received from a first device, including a device specifically configured to receive user location requests and provide locations and directions to determined locations. In other instances, the first device may be associated with a particular user, such as a user's mobile device. In some cases, the request may be associated with an existing scheduled meeting, while in other instances, the request may be associated with an unscheduled meeting. The user associated with the request (e.g., the requestor) may be a visitor to a monitored location at which the at least one particular person works or is otherwise associated.

Figure 4:
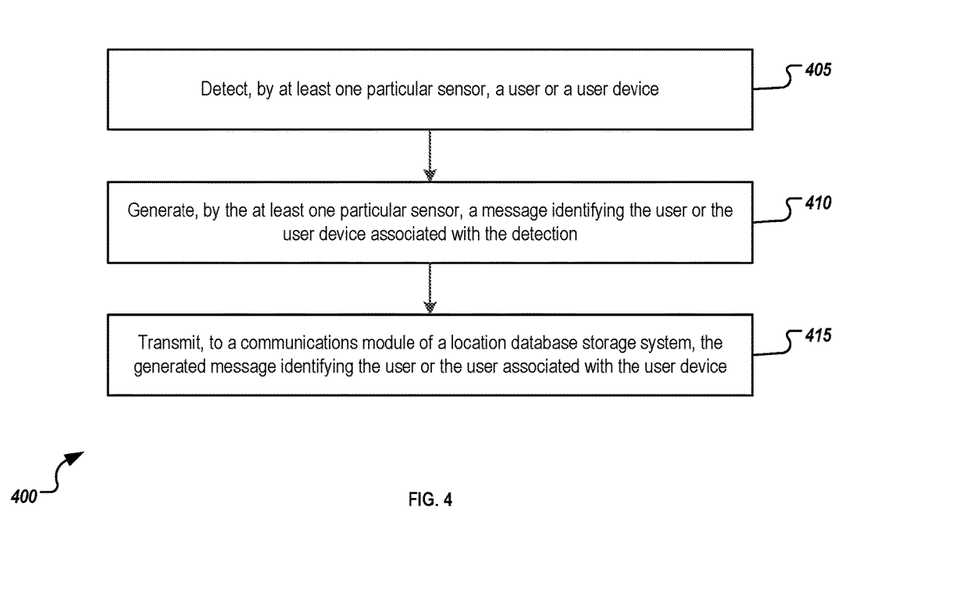
FIG. 4 is a flow chart of an example method performed by at least one sensor to detect and provide location information associated with a user and/or a user device to update a user location database.

At 310, a current location associated with the at least one particular person associated with the request is determined. The current location may be a location associated with a particular sensor at which the at least one particular person was most recently located. In some instances, each of a plurality of sensors within a monitored area may be specifically associated with a location, such as a desk, a room, or a hallway, among others. In response to detections by those particular sensors of either the user or a device associated with user, location information specific to the user can be set in a location database. In other instances, one or more of the sensors may be able to detect a particular location within the monitored location, such that detection of the user or user device is associated with a location determination as well, and not the specific location associated with the detecting sensor or sensors. Further description of the sensor and location update process is included above, as well as illustrated in FIG. 4.

In some instance, locating the current location of the at least one particular person may include additional operations and considerations, including those discussed previously. For example, the current location, or the last location identified by the sensors and the location detection system, may be a first location determined. At 315, a further determination as to a second location to which the requestor is to be sent or instructed to go may be performed. In some instances, that determination may be based at least in part on a location of the requestor. In some instances, the determination may be based on an authorization of the requestor within the monitored location, such as whether the requestor is allowed and authorized to move to a location of the at least one particular person. In some instances, a second location within the monitored location different than the first location may be determined to be a better or appropriate location for the meeting. For example, a meeting room in a non-secured portion of the monitored location may be identified as available (e.g., because no reservations for the room exist, based on a determination by one or more sensors that no one is currently using the room, etc.). In those instances, the determination of the location for the meeting can be changed to the second location. In still other instances, a location may be determined that is relatively closer to the requestor and within a particular threshold distance from the at least one particular person's current location. In those instances, that location may be a location used for private meetings within the threshold distance from the user's current location, which may be a desk or office. In still other instances, the actual location for the meeting may be determined based on the requestor or attributes associated with the requestor, such as a determined current sentiment of the requestor. If the requestor is a customer, the location may be determined in a more formal environment (e.g., a meeting or conference room). If the requestor is another employee similar to the at least one particular person, a more informal location may be appropriate, such that the current location of the at least one particular person is an appropriate meeting place. In some instances, where the sentiment analysis determines that a requestor is irate, upset, or otherwise in a particular mood or associated with a particular sentiment, the determination can be used to identify an appropriate location based on that determined sentiment. In other words, the exact current location of the at least one particular person may not always be the location to which the requestor is sent. Any number of suitable location rules can be applied to make such determinations, and can provide a smart routing solution to the users and visitors of the monitored location. In some instances, the second location determined may be the same as the current location, while in others, a second location different than the current location may be determined.

At 320, a response to the received request can be generated, where the generated response includes the second location determined to be a location at which the meeting should occur. In some instances, in addition to the particular second location, a set of travel instructions to reach the second location may be generated and included in the response. Once generated, the response can be transmitted, via the communications module, to the device associated with the request at 330. In some instances, the response may be provided, via the communications module, to a voice assistant interface, where the response can be translated into a natural language response and provided, via a voice prompt, to the requestor.

At optional 325, a notification of the received request may be generated and transmitted, via the communications module, to at least one of the at least one particular persons. For example, the notification may include an identification of the requestor, information about a pre-planned meeting (where appropriate), and a set of information associated with the requestor. In some instances, a sentiment analysis, or the results thereof, may be included in the notification. In some instances, the notification may be provided before the response of 320 is generated, and may include a link or other option to refuse or ignore the request. If that option is selected, the generated response may instead indicate that the at least one particular person is unavailable for the current visit, and instruct the requestor to return at another time. In some instances, the response can include alternative persons to attempt to reach based on a preset alternative or dynamical determined identification of a similar user or person.

FIG. 4 is a flow chart of an example method 400 performed by at least one sensor to detect and provide location information associated with a user and/or a user device to update a user location database. It will be understood that method 300 and related methods may be performed, for example, by any suitable system, environment, software, and hardware, or a combination of systems, environments, software, and hardware, as appropriate. For example, a system comprising a communications module, at least one memory storing instructions and other required data, and at least one hardware processor interoperably coupled to the at least one memory and the communications module can be used to execute method 300. In some implementations, the method 300 and related methods are executed by one or more components of the system 100 described above with respect to FIG. 1, or the components described in FIG. 2.

In particular, the operations of FIG. 4 are performed by a plurality of sensors used to monitor and update location information associated with any number of users within a monitored area. The sensors may be a combination of any sensors and/or sensor types, and can monitor the area for detections of particular users (e.g., using biometric data and/or computer vision) or may detect user devices associated with particular users, where those devices are used as proxies for the location of the associated users. Example types of sensors to be used in various implementations and can perform tracking including, but not limited to, media access control (MAC) address tracking of devices at the location of the particular sensor, beacon-based determinations of a device's presence at or near the location of the particular sensor, a WiFi network connection analysis to identify connections to particular devices within a location associated with the sensor, an aGPS analysis of particular devices within a location associated with the sensor, and a scan of a unique user identifier from a device associated with a particular person, among others. For detections of particular users, a biometric analysis of persons at the location of the particular sensor, a machine vision tracking identifying persons present at the location of the particular sensor, and scanning of RFID tags associated with persons at the location of the particular sensor may be used.

At 405, at least one particular sensor can detect a user or a user device. In some instances, a single sensor can detect the user or user device, where the single sensor is associated with a location within the monitored area. In other instances, one or more sensors may be used to identify a location of the user or user device within the monitored area, where the identification is not directly or specifically associated with the location of the sensor. In those instances, the location can be determined and associated with the detection.

At 410, the at least one particular sensor can generate a message or notification identifying the particular detected user or user device. Some or all of the sensors may be capable of sending and/or receiving messages via a network connection (wired or wireless), or by another communication channel. The message can include a specific identification of the user, or the message may include a description of the user and/or the user device, where the backend server or other system uses that information to identify the particular user associated with the detection. In some instances, the message may also include a timestamp or other timing-based identifier to be used in associating the received detection as a latest location within a user location database. At 415, the generated message can be transmitted to the communications module of the location database system (e.g., location analysis system 170 of FIG. 1), where the information in the message can be interpreted and used to update the database.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   a communications module;
   a plurality of sensors physically located in a defined area associated with an entity, each of the plurality of sensors configured to at least partially determine locations of at least one person;
   at least one memory storing instructions and a location database including location information received from the plurality of sensors associating particular persons associated with the entity with particular locations associated with particular sensors;
   at least one hardware processor interoperably coupled with the at least one memory and the communications module, wherein the instructions instruct the at least one hardware processor to:
      receive from a first device, via the communications module, a request for a location associated with at least one particular person, wherein the request is associated with a first person, and wherein the request for the location associated with at least one particular person comprises a request from the first person for a location within the defined area associated with the entity at which a meeting with the at least one particular person is to occur;

determine, from the location database, a current location associated with one of the plurality of sensors associated with the at least one particular person associated with the request, wherein determining, from the location database, the current location associated with the at least one particular person comprises:

identifying a location associated with the at least one particular person from the location database, wherein the identified location comprises a first location; and determining, based on the first location and a location of the first person, a second location different than the first location at which the at least one particular person can meet the first person within the defined area associated with the entity, wherein determining includes:

identifying at least one location different than the first location;

determining, based on information from at least one sensor associated with at least one identified location, whether the at least identified location different than the first location is associated with at least one person at a time of the request; and in response to determining that the at least one identified location is not associated with at least one person at the time of the request, identifying the at least one identified location as the second location;

generate a response to the received request, the generated response including the determined second location;

generate a notification of the received request to the at least one particular person, the notification including an identification of the determined second location; and transmit, via the communications module, the generated response to the first device and the generated notification to the at least one particular person.

2. The system of claim 1, wherein each of the plurality of sensors determines locations of at least one person based on one or more devices associated with particular persons.

3. The system of claim 2, wherein the sensors perform at least one of:

media access control (MAC) address tracking of devices at the location of the particular sensor;

a beacon-based determination of a device's presence at the location of the particular sensor;

a WiFi network connection analysis to identify connections to particular devices within a location associated with the sensor;

an assisted Global Positioning Satellite (GPS) (aGPS) analysis of particular devices within a location associated with the sensor; and a scan of a unique user identifier from a device associated with a particular person.

4. The system of claim 1, wherein each of the plurality of sensors is associated with a particular location within the defined area, and wherein, in response to a particular sensor detecting a particular person or a device associated with the particular person, the location of the particular person is associated with the particular location within the defined area associated with the particular sensor.

5. The system of claim 1, wherein the sensors determine locations of at least one person based on at least one of:

a biometric analysis of persons at the location of the particular sensor;

machine vision tracking identifying persons present at the location of the particular sensor; and scanning RFID tags associated with persons at the location of the particular sensor.

6. The system of claim 1, wherein each sensor is associated with a particular location in an office, and wherein the sensors communicate with the at least one hardware processor via at least one of a WiFi, Ethernet, or intranet connection.

7. The system of claim 6, wherein the location database includes information identifying at least one of a particular desk or a particular room within the defined location at which the at least one person is associated.

8. The system of claim 1, wherein the second location comprises a meeting room, and wherein the first location is a desk at which the at least one particular person is located.

9. The system of claim 1, wherein the at least one identified locations different than the first location include locations for use of private meetings within a threshold distance from the first location.

10. The system of claim 1, wherein the instructions further instruct the at least one processor to:

generate a notification of the received request to the at least one particular person in response to generating the response.

11. The system of claim 10, wherein the received request is received from a voice assistance interface system, wherein the voice assistance interface system performs a sentiment analysis of the request in response to submission of the request via the voice assistance interface system, and wherein the generated notification of the received request includes an indication of results associated with the performed sentiment analysis.

12. The system of claim 1, wherein the generated response includes an indication of directions to the determined current location.

13. A non-transitory, computer-readable medium storing computer-readable instructions executable by a computer and configured to:

receive from a first device, via a communications module, a request for a location associated with at least one particular person, wherein the request is associated with a first person, and wherein the request for the location associated with at least one particular person comprises a request from the first person for a location within a defined area associated with an entity at which a meeting with the at least one particular person is to occur;

determine, from a location database, a current location associated with one of a plurality of sensors associated with the at least one particular person associated with the request, wherein the plurality of sensors are physically located in the defined area associated with the entity, wherein each of the plurality of sensors is configured to at least partially determine locations of at least one person, and wherein the location database includes location information received from the plurality of sensors associating particular persons associated with the entity with particular locations associated with particular sensors, wherein determining, from the location database, the current location associated with the at least one particular person comprises:
- identifying a location associated with the at least one particular person from the location database, wherein the identified location comprises a first location; and
- determining, based on the first location and a location of the first person, a second location different than the first location at which the at least one particular person can meet the first person within the defined area associated with the entity, wherein determining includes:
  - identifying at least one location different than the first location;
  - determining, based on information from at least one sensor associated with at least one identified location, whether the at least identified location different than the first location is associated with at least one person at a time of the request; and
  - in response to determining that the at least one identified location is not associated with at least one person at the time of the request, identifying the at least one identified location as the second location;

generate a response to the received request, the generated response including the determined second location;

generate a notification of the received request to the at least one particular person, the notification including an identification of the determined second location; and transmit, via a communications module, the generated response to the first device and the generated notification to the at least one particular person.

14. The computer-readable medium of claim 13, wherein each of the plurality of sensors determines locations of at least one person based on one or more devices associated with particular persons, and wherein the sensors perform at least one of:
- media access control (MAC) address tracking of devices at the location of the particular sensor;
- a beacon-based determination of a device's presence at the location of the particular sensor;
- a WiFi network connection analysis to identify connections to particular devices within a location associated with the sensor;
- an assisted Global Positioning Satellite (GPS) (aGPS) analysis of particular devices within a location associated with the sensor; and
- a scan of a unique user identifier from a device associated with a particular person.

15. The computer-readable medium of claim 13, wherein each of the plurality of sensors is associated with a particular location within the defined area, and wherein, in response to a particular sensor detecting a particular person or a device associated with the particular person, the location of the particular person is associated with the particular location within the defined area associated with the particular sensor.

16. The computer-readable medium of claim 13, wherein the sensors determine locations of at least one person based on at least one of:
- a biometric analysis of persons at the location of the particular sensor;
- machine vision tracking identifying persons present at the location of the particular sensor; and
- scanning RFID tags associated with persons at the location of the particular sensor.

17. A computerized method performed by one or more processors, the method comprising:
- receiving from a first device, via a communications module, a request for a location associated with at least one particular person, wherein the request is associated with a first person, and wherein the request for the location associated with at least one particular person comprises a request from the first person for a location within a defined area associated with an entity at which a meeting with the at least one particular person is to occur;
- determining, from a location database, a current location associated with one of a plurality of sensors associated with the at least one particular person associated with the request, wherein the plurality of sensors are physically located in the defined area associated with the entity, wherein each of the plurality of sensors is configured to at least partially determine locations of at least one person, and wherein the location database includes location information received from the plurality of sensors associating particular persons associated with the entity with particular locations associated with particular sensors, wherein determining, from the location database, the current location associated with the at least one particular person comprises:
  - identifying a location associated with the at least one particular person from the location database, wherein the identified location comprises a first location; and
  - determining, based on the first location and a location of the first person, a second location different than the first location at which the at least one particular person can meet the first person within the defined area associated with the entity, wherein determining includes:
    - identifying at least one location different than the first location;
    - determining, based on information from at least one sensor associated with at least one identified location, whether the at least identified location different than the first location is associated with at least one person at a time of the request; and
    - in response to determining that the at least one identified location is not associated with at least one person at the time of the request, identifying the at least one identified location as the second location;
- generating a response to the received request, the generated response including the determined second location;
- generate a notification of the received request to the at least one particular person, the notification including an identification of the determined second location; and
- transmitting, via a communications module, the generated response to the first device and the generated notification to the at least one particular person.

* * * * *